United States Patent [19]

Takaoka

[11] 4,286,221
[45] Aug. 25, 1981

[54] MULTI-FREQUENCY SIGNAL RECEIVING APPARATUS

[75] Inventor: Kazuhiko Takaoka, Tokyo, Japan
[73] Assignee: Hitachi, Ltd., Tokyo, Japan
[21] Appl. No.: 81,359
[22] Filed: Oct. 3, 1979
[30] Foreign Application Priority Data
  Oct. 4, 1978 [JP] Japan ................ 53-121543
[51] Int. Cl.³ .......... H03K 9/06; H03K 5/26; H04L 27/26
[52] U.S. Cl. ............. 328/140; 328/137; 328/138; 328/153; 307/524
[58] Field of Search ........... 328/137, 138, 140, 153; 307/233

[56] References Cited
U.S. PATENT DOCUMENTS

| | | | |
|---|---|---|---|
| 3,555,435 | 1/1971 | Vosteen | 328/153 X |
| 3,747,025 | 7/1973 | Iten et al. | 328/140 X |
| 3,805,171 | 4/1974 | Drumheller | 328/140 |
| 3,812,432 | 5/1974 | Hanson | 328/138 |
| 4,017,742 | 4/1977 | James | 328/137 X |

Primary Examiner—John S. Heyman
Attorney, Agent, or Firm—Craig and Antonelli

[57] ABSTRACT

A multi-frequency signal receiving apparatus for receiving signals with at least more than two frequencies and selectively separating these signals, comprising a first maximum value detecting means for detecting the maximum value of the rectified outputs of a plurality of channel filters provided for said signals to be selected; a second maximum value detecting means for detecting the maximum value of the rectified outputs at the intermediate stage of two channel filters for discriminating the signals at both ends of the signal frequency bands of a plurality of said channel filters; and a comparison means for comparing the outputs of said first and second maximum value detecting means with an appropriate weight and thereby detecting the presence or absence of the signal to be detected; whereby based on the result of comparison, the threshold value of discriminators placed at the succeeding stage of said channel filters for discriminating the predominant frequency signal is controlled. The invention thus permits the elimination of input filers, and realizes an economical and reliable signal receiver.

6 Claims, 4 Drawing Figures

MULTI-FREQUENCY SIGNAL RECEIVING APPARATUS

This invention relates to a multi-frequency signal receiving apparatus, and more particularly to a multi-frequency signal receiving apparatus which receives plural input signals with different frequencies, discriminates and converts them into d.c. output signals, and sends these output signals to plural output points in accordance with the frequencies of the input signals.

Before the explanation of this invention in comparison with a prior art, a brief explanation will be made of the drawings, in which.

Figure 1:
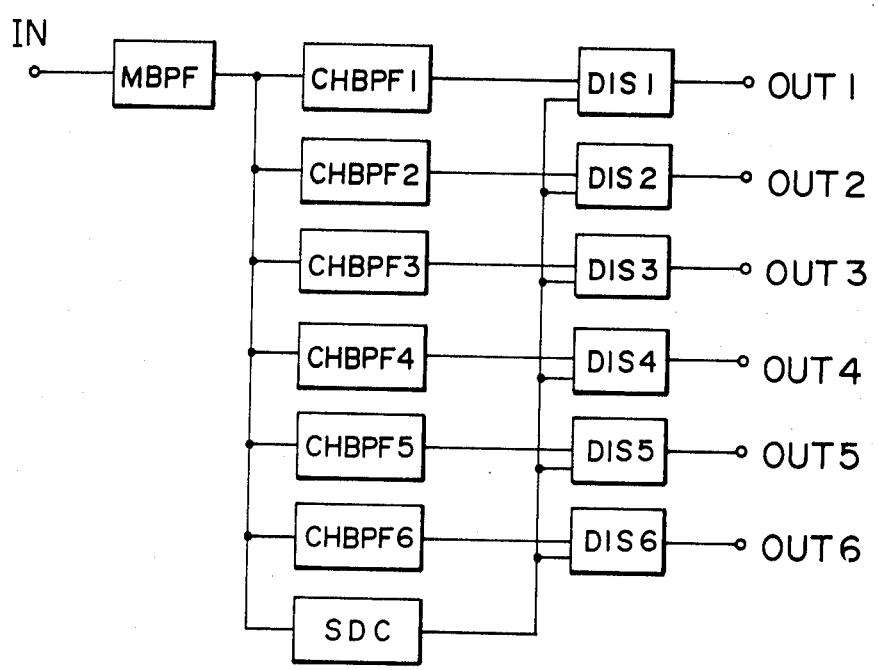
FIG. 1 is a block diagram showing a prior art multi-frequency signal receiving apparatus.

The constitution of a prior art multi-frequency signal receiving apparatus is as shown in FIG. 1, in which waves with different frequencies arrive at an input terminal IN and then enter a common main band-pass filter MBPF. The MBPF selects a signal group in a required frequency band from a signal outside this band, the latter being either mixed in the input signal or coming independently thereof. The outputs of the MBPF are made to enter the channel band pass filters CHBPF 1, 2, ..., 6 provided for each frequency band. Each CHBPF detects a wave in a selected band from the input signal frequency group and sends only the due component to the output. The output of each CHBPF 1, 2, ..., 6 is connected to the input of each discriminator DIS 1, 2, ... 6 having a fixed threshold and the output is compared with the above fixed threshold and it is also compared with the output information of a later-mentioned signal detection circuit SDC.

The output of the MBPF is also connncted to a signal detection circuit in order to control the signal timing system of the receiver. When the output of the MBPF exceeds a preset threshold level, the SDC generates a pulse train in response to the output of the MBPF, rectifies and shapes. After a predetermined delay time the d.c. signal is sent to the DIS 1, 2, ..., 6.

Accordingly, after the d.c. signal comes from the SDC, the DIS 1, 2, ..., 6 convert the outputs of the CHBPF 1, 2, ..., 6 into pulse signals with two values, rectify and shape them, and send them to output terminals OUT 1–6.

In a multi-frequency receiving apparatus with such a constitution, if the value of a sensitive level of the inputs with different frequencies spreads over a wide range, the ranges of output levels of the CHBPF 1, 2, ..., 6 become also wide. Thus, it is necessary that the threshold values of the DIS 1, 2, ..., 6 should be less than the minimum sensitive level. However, since the CHBPF 1, 2, ..., 6 are not ideal band pass filters, waves in adjacent bands leak and appear at the output. It can happen that a signal with a high input level in the adjacent band exceeds the threshold of the DIS 1, 2, ..., 6. In order to solve this problem, a variable threshold method has been proposed, according to which the threshold of the DIS 1, 2, ..., 6 is not fixed but is varied in accordance with the input signal level. One example is seen in Japanese Patent Laid-Open No. 34607/77 specification, which discloses a method having means for controlling the threshold of discriminators by the maximum value of the rectified levels of the channel filter outputs. A similar method is also seen in Japan Telecomunication Review, April 1978.

However, even with this variable threshold method it is difficult to discriminate the normal input signal perfectly from the disturbing signal outside the frequency band. The usual countermeasure is to increase the order and Q (quality factor) of the MBPF and the CHBPF to give a large attenuation to the signal outside the frequency band. A demerit which arises is that plural accurate band pass filters are required. Further defects are high cost and large size.

A method capable of eliminating the main band pass filter is proposed in Japanese Patent Laid-Open No. 91612/78. However, this method often disables the signal detection even when a signal with a frequency far from the frequency band of the normal input signal arrives, and thus damages the detection of the normal input signal. The method, therefore, is easily affected by noise.

One object of this invention is to provide an economical and small sized multi-frequency signal receiving apparatus capable of eliminating the main band pass filter.

Another object of this invention is to provide a reliable multi-frequency signal receiving apparatus free from any erroneous operation in the presence of a signal with a frequency adjacent to that of the normal input signal, and scarcely affected by noise.

A further object of this invention is to provide an accurate multi-frequency signal receiving apparatus which ensures no operation at the absolutely insensitive level and performs a reliable signal detection.

This invention comprises a first maximum value detecting means which detects the maximum value of the rectified output levels of the channel filters provided for each signal to be detected; a second maximum value detecting means which detects the maximum value of the rectified levels of the outputs at the intermediate stage of two channel filters for discrimiating the signals at both ends of the signal frequency bands; a means for comparing the values of the first and second maximum value detecting means with an appropriate weight; and a means for commonly controlling the threshold of the discriminators in accordance with the result of comparison.

Figure 2:
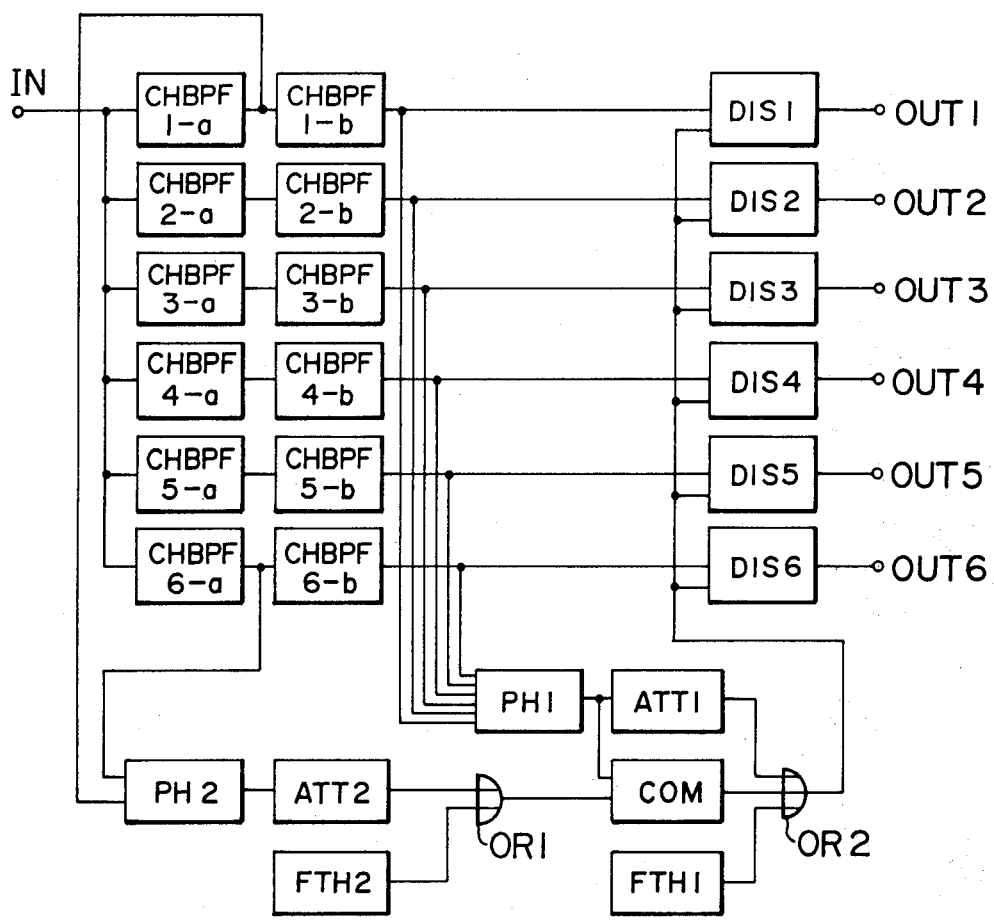
FIG. 2 is a block diagram showing one embodiment of a multi-frequency signal receiving apparatus according to this invention.

An explanation of this invention will be made hereinafter with reference to the drawings. FIG. 2 is a block diagram showing one embodiment of this invention. In this figure, CHBPF 1, 2, ..., 6 are channel band pass filters of fourth order, with characters a and b at each second order circuit, the DIS 1, 2, ..., 6 are discriminators provided in one to one correspondence with the CHBPF 1, 2, ..., 6. The output of the CHBPF 1, 2, ..., 6 are compared with the output of an analog OR-circuit OR2. If there is an output of the CHBPF 1, 2, ..., 6 with a predominant level, any corresponding ones of the DIS 1, 2, ..., 6 send a d.c. signal pulse to any ones of the output terminals 1, 2, ..., 6. PH1 is a first rectifying type peak voltage detection-hold circuit whose inputs are connected to the outputs of the fourth order circuits 1-b, 2-b, ..., 6-b of the CHBPF 1, 2, ..., 6. It is so constituted that the linear a.c. signals of the circuits of the fourth order are rectified and that their maximum values are held. PH2 is a second rectifying type peak voltage detection-hold circuit having a similar function to that of PH1. The inputs of PH2 are the outputs of the first stage circuits of second order 1-a of the CHBPF 1 and 6-a of the CHBPF 6 which pass those signals in the frequency bands on both ends. ATT1, and 2 are attenuators which attenuate the outputs of the first and second rectifying type peak voltage detection-hold circuits PH1 and PH2 below a prescribed level respectively. FTH 1 and 2 are fixed threshold circuits which generate a d.c. voltage with a constant value to prevent any error operation in the presence of a signal with a level below the sensitive level. OR1 and OR2 are analog OR circuits which compare plural input signals and send a signal with a predominant level to their outputs. COM is a signal comparison-detection circuit which compares the output of PH1 and the output of the OR1. If the absolute value of the output level of the PH1 is larger than that of the OR1, a positive d.c. pulse is generated, while in the oppposite case a negative d.c. pulse is generated.

Figure 3:
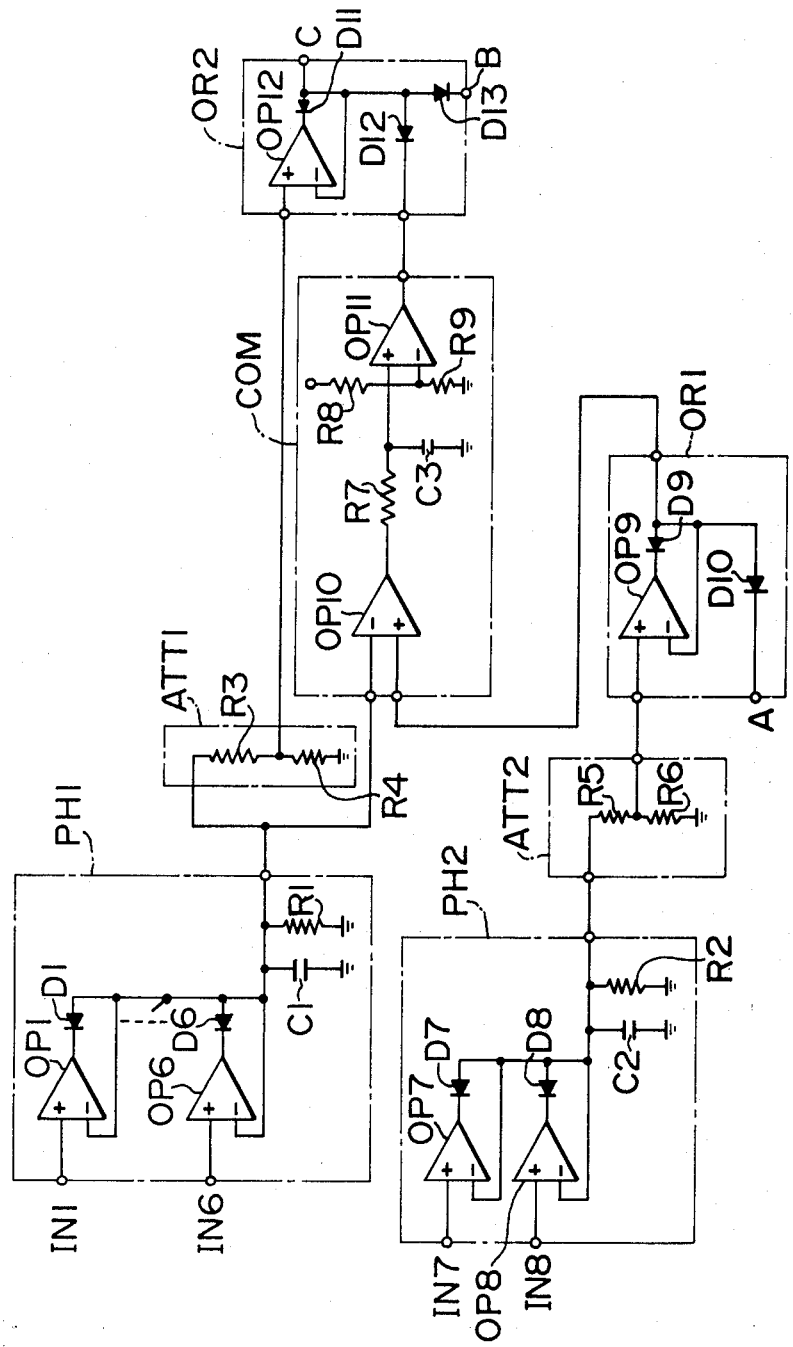
FIG. 3 is a circuit arrangement showing a concrete circuit of the main part of FIG. 2.

FIG. 3 shows an example of a concrete circuit construction of the common circuit section of FIG. 2.

In FIG. 3, the input terminals IN1–IN6 of PH1 are connected to the outputs of the circuits 1-b–6-b of fourth order of the CHBPF 1–6 of FIG. 2 respectively. The outputs are half-wave rectified by differential input operational amplifiers OP1–OP6 and diodes D1–D6 into d.c. voltages. The detected negatively maximum value is held in a capacitor C1. The d.c. voltage held in converted to a required voltage by resistors R3 and R4 in ATT1, and also applied to a negative input terminal of a differential input operational amplifier OP10 in COM.

Furthermore, the input terminals IN7 and IN8 of PH2 are connected to the outputs of the circuits of second order 1-a and 6-a of the CHBPF 1 and 6 in FIG. 2 respectively. The outputs of the circuits 1-a and 6-a are half-wave rectified by differential input operational amplifiers OP7 and OP8 and diodes D7 and D8 into d.c. voltages, respectively. The negatively larger value of them is held in a capacitor C2. The d.c. voltage held is converted to a required voltage by resistors R5 and R6 in ATT2 and then applied to a positive input terminal of a differential input operational amplifier OP9 in OR1. OR1 consisting of OP9 and diodes D9 and D10 compares the d.c. voltage from ATT2 and the output voltage of FTH 2 of FIG. 2 applied at a terminal A. The negatively larger value is supplied to a positive input terminal of OP10 in COM. Although OR1 is composed of one differential input operational amplifier here, it may be allowed that two such operational amplifiers are provided for the two input voltages. The latter case has a merit that comparison between minute levels can be done accurately.

Next, in the signal comparison-detection circuit COM, the output voltage of PH1 and the output voltage of OR1 are compared by OP10. If the absolute value of the negative voltage at the neagtive input terminal is larger than that of the negative voltage at the positive input terminal, OP10 yields a positive voltage while in the opposite case OP10 yields a negative voltage. A differential input operational amplifier OP11, resistors R7, R8 and R9 and a capacitor C3 are provided for controlling the timing; that is, they act as a delay timer. With provision of such a circuit, the output of COM is delayed by a constant time after the arrival of a receiver signal, whereby the transcient responses of the CHBPF 1, 2, . . . , 6 in FIG. 2 are absorbed.

The output of COM is supplied to the analog OR circuit OR2 to be compared with the output of ATT1 and the output of FTH1 at a terminal B. Here, if the output voltage of COM is positive, a diode D12 is cut off. If the output voltage of ATT1 is larger than the fixed threshold value of FTH1, the output voltage value of ATT1 is supplied to an output terminal C. The terminal C is connected commonly with the threshold input terminals of discriminators DET 1, 2, . . . , 6 of FIG. 2. As a result, the output voltage of ATT1 becomes the threshold level of DET 1, 2, . . . , 6. Furthermore, if the fixed threshold value of FTH1 is larger than the output value of ATT1, the fixed threshold value becomes the threshold level of the DIS 1, 2, . . . , 6.

If the output voltage of COM is negative, the value is supplied to the output terminal C since it is large. Then, the threshold voltage of the DIS 1, 2, . . . , 6 becomes high and prevents the detection of input signal.

Now, assume that a signal to be selected is applied at the input terminal IN as an input signal. In this case, the difference of attenuation for the input signal is not large between the output of the circuit of second order a and the output of the circuit of fourth order b of CHBPF 1, 2, . . . , 6. Therefore, for a signal having a frequency in the band of either the CHBPF 1 or 6, if the value of the ATT2 is so selected that the attenuated value of the maximum value of the outputs of the circuit 1-a or 6-a may be smaller than the maximum value of the outputs of the circuits 1-b, . . . , 6-b, the output of the COM becomes positive. Thus, the common thresold value of the DIS 1, 2, . . . , 6 is given by a value of the output of PH1 attenuated by the ATT1 down to a prescribed value. PH1 detects the maximum value of the outputs of the circuits of fourth order 1-b, 2-b, . . . , 6-b of the CHBPF 1, 2, . . . , 6. Here, it is assumed, of cource, that the input signal has a value larger than the sensitive level of the receiver. If the signal level is under the sensitive level, signal detection is prevented by the fixed threshold value of FTH1. The provision of the ATT1 is meant for the existence of two frequency waves with different levels. The value of attenuation is determined in order to receive such two frequency waves with different levels.

Now, assume that an input disturbing frequency signal outside the frequency band is supplied to the input terminal IN of FIG. 2. In this case, the output of the circuit of second order a of the CHBPF becomes larger than the output of the circuit of fourth order b of the CHBPF. Their difference becomes larger, according as the input frequency is separated more from the central frequency of the CHBPF. As described before, since the rectifying type peak voltage detection-hold circuit PH2 receives, as its inputs, the outputs of the circuits of second order 1-a and 6-a of the CHBPF 1 and 6 which pass the signal at both end frequency bands, it can detect the most predominant level of the signals outside the frequency band or of the signals at the end frequency bands. Therefore, when a signal outside the frequency band comes, since the attenuation factor of the ATT2 is set in such a manner that the output of the ATT2 is larger than the output of PH1 which detects the maximum value of the outputs of the circuits of fourth order 1-b, . . . , 6-b, the signal comparison-detection circuit COM discriminates that the coming signal is outside the frequency band. That is, the attenuation degree of the ATT2 is set in such a manner that the output of PH1 becomes large when a signal to be selected is being received while the output of the ATT2 whose input is the output of PH2 becomes large when a disturbing signal outside the frequency band is being received. As a result, when a signal outside the frequency band having a large level is received, the output of the signal comparisoin-detection circuit COM becomes a negative voltage, and the signal detection by the DIS 1, 2, . . . , 6 is prevented. Here, the existence of the fixed threshold circuit FH2 and the analog OR circuit OR1 having a function of comparing the outputs of FTH2 and ATT2 is for the following purposes. Usually, small signals exist between the normal signals to be selected. These small signals cause a fear that even after the disappearance of normal input signals the output signal of the signal comparison-detection circuit COM continues. Thus, if the output of the ATT2 compared with the output of FTH2 by OR1 is smaller, the fixed threshold value of FTH2 is sent to the output. COM compares this fixed threshold value with the output of the first rectifing type peak voltage detection-hold circuit PH1. If the output of PH1 is a small voltage less than the fixed threshold value, it is forced to be changed from positive to negative in order that the signal detection is prohibited. By this mehtod, the parts between the normal signals, which inherently should be free from any signal, can be discriminated perfectly, and so any erroneous or useless operation of the receiver can be prevented.

Figure 4:
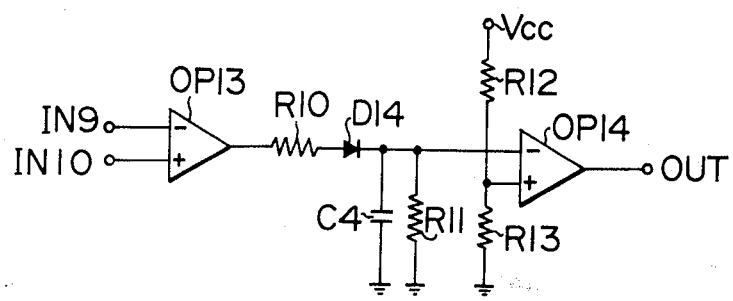
FIG. 4 is a circuit arrangement showing one example of the discriminator of FIG. 2.

As described above, depending on whether the input signal is a signal to be selected or a disturbing signal outside the band and on whether the signal level is larger or smaller than the sensitive level, a desired threshold value vaoltage is applied to the inputs of the DIS 1, 2, . . . , 6. FIG. 4 shows an example of a concrete circuit of the discriminator DIS. To a negative input terminal IN9 of a differential input operational amplifier OP13, the output of the circuit of fourth order b of the CHBPF in the preceding stage is applied. To a positive input terminal IN10 of OP13, the output of the analog OR circuit OR2 shown in FIG. 3 is applied. OP13 compares the output of the CHBPF with the threshold value obtained by OR2. If there is an output of the CHBPF larger than the threshold value, an output with a rectangular waveform synchronized with the frequency of the signal is obtained. This rectangular wave is converted into a d.c. level by a rectifying circuit formed by a differential input operational amplifier OP14, resistors R10, R11, R12 and R13, a capacitor C4 and a diode D14. The d.c. signal is sent to an output terminal OUT. By giving an integration characteristic to the rectifying circuit, an error output due to a falling transcient response of the channel band pass filter in the preceding stage and interruption can be prevented.

As mentioned above, according to this invention, any necessity of using such a complicated, accurate, expensive and large sized main band-pass filter as used in the prior art can be eliminated. Furthermore, the order of the channel band pass filter can be decreased. So, an economical and small sized receiving apparatus can be realized. When a disturbing signal with its frequency near the frequency band of the signal to be selected arrives, and this disturbing signal has a large level enough to cause mixing with the normal signal, the detection function is stopped, while if the disturbing signal has a very small level, only the normal signal can be detected by the receiver. Thus, a highly reliable receiving apparatus capable of discriminating the selected signal completely from any disturbing signal outside the band can be achieved. Moreover, any disturbing signal with a frequency separated far from the frequency of the selected signal enough to cause no mixing is neglected. Such a disturbing signal does not stop the detection function of the receiver without interrupting secure signal detection.

The rectifying type peak voltage detection-hold circuit and the analog OR circuit, which are formed by a combination of differential input operational amplifiers and diodes, easily and accurately ensure the detection of the maximum value, even if the maximum value is near zero level. This has an economical advantage. The fact that the attenuator is realized by a resistor voltage division circuit, which is a typical level conversion circuit, means that the receiver is economical.

In order to make this invention more effective, an output delay function may be given to the signal comparison-detection circuit such that the output of the signal-detection circuit is delayed by a constant time after the arrival of a receiving signal, whereby any transcient response of the channel band pass filter can be absorbed. Further, the provision of the fixed threshold value circuit ensures non-operative condition at an absolutely insensitive level, which permits a secure signal detection.

Although, in the foregoing explanation, the invention had a function of detecting the maximum value of the circuits of second order of channel band pass filters which pass a signal with a frequency at both ends of the frequency bands, the invention is not limited thereto. For example, if the channel band pass filters has sixth order, the maximum value of the circuits of fourth order may be detected.

What is claimed is:

1. A multi-frequency signal receiving apparatus which receives multi-frequency input signals, separates and selects said multi-frequency input signals comprising, means for separating said multi-frequency signals, said means being a plurality of channel filters for discriminating required signals out of said input signals;

means for discrimianting any predominant frequency signals out of the signals filtered by said plurality of channel filters;

a first maximum value detecting means for detecting the maximum value of the levels of the outputs of said plurality of channel filters;

a second maximum value detecting means for detecting the maximum value of the levels of the outputs at an intermediate stage of two channel filters which discriminate the signals at both ends of the frequency bands of said plurality of channel filters;

a comparison means for comparing the detected values of said first and second maximum value detecting means with an appropriate weight; and a means for controlling the detection of said input signals in accordance with the result of comparison of said comparison means.

2. A multi-frequency signal receiving apparatus according to claim 1, in which said second maximum value detecting means detects the maximum value of the rectified levels of the second order filters for passing the input signals to the two channel filters which discriminate the signals at both ends of the frequency bands.

3. A multi-frequency signal receiving apparatus according to claim 1 or claim 2 comprising, a means for generating a predetermined fixed value voltage; and a means for comparing said fixed value voltage from said fixed voltage generating means with said maximum value as detected by said second maximum value detecting means and attenuated to a prescribed value, and supplying the more predominant level to said comparison means.

4. A multi-frequency signal receiving apparatus according to claim 1, in which said comparison means has a function of delaying the output signal.

5. A multi-frequency signal receiving apparatus according to claim 1, in which there is further provided an attenuation means for converting the level of the maximum value detected by said second maximum value detecting means by a resistor voltage division circuit.

6. A multi-frequency signal receiving apparatus according to claim 1, in which the basic unit circuits for said first and second maximum value detecting means are formed by differential input operational amplifiers with first and second input terminals and an output terminal and by a diode with such a structure that the first input terminal of said differential input operational amplifier is a signal input terminal while the second input terminal and the output terminal thereof are connected with the diode in order to derive the maximum value of the signal inputs applied at said first input terminals from a point connecting said second input terminals.

* * * * *